United States Patent [19]

Buyens et al.

[11] Patent Number: 5,472,262
[45] Date of Patent: Dec. 5, 1995

[54] DOUBLE SLOT WIRE SAWING APPARATUS AND METHOD

[76] Inventors: Marc O. R. G. Buyens, 14 Mann Street, Riebeeckstadt; Peter L. D. O'Toole, 35 Hofsanger Street, Welkom; John J. Prendergast, 7 Ibis Street, Welkom; Robert A. Miller, 166 Mercutio Street, Welkom; Sarel J. Pretorius, 43 Falstaff Street, Welkom, all of South Africa

[21] Appl. No.: 233,179

[22] Filed: Apr. 26, 1994

[30] Foreign Application Priority Data

Apr. 28, 1993 [ZA] South Africa ............... 93/2986
Aug. 23, 1993 [ZA] South Africa ............... 93/6159

[51] Int. Cl.⁶ .................. B28D 1/08; E21C 25/20
[52] U.S. Cl. ........................ 299/15; 299/35; 125/21
[58] Field of Search ............... 299/15, 35; 125/21

[56] References Cited

U.S. PATENT DOCUMENTS

| | | | |
|---|---|---|---|
| 753,092 | 2/1904 | Nevkirch | 299/35 |
| 4,038,962 | 8/1977 | Tessner | 125/21 |
| 4,765,307 | 8/1988 | Kubo | 125/21 |
| 5,060,628 | 10/1991 | Ishida | 125/21 |

FOREIGN PATENT DOCUMENTS

| | | |
|---|---|---|
| 2062077 | 9/1992 | Canada . |
| 331301 | 9/1903 | France . |
| 1427064 | 12/1965 | France . |
| 1-222903 | 6/1989 | Japan . |

Primary Examiner—David J. Bagnell
Attorney, Agent, or Firm—Pennie & Edmonds

[57] ABSTRACT

The invention relates to a double slot wire sawing machine and to a method of mining using the machine. The machine has a mobile chassis with a driving arrangement for simultaneously and independently driving two separate wire saws which each cut their own slot in the material being mined. The driving arrangement maintains one wire saw directly over the other by equalizing the tensions in the wire saws at the commencement of a cutting operation and, during cutting, by varying the respective wire saw speeds.

14 Claims, 5 Drawing Sheets

DOUBLE SLOT WIRE SAWING APPARATUS AND METHOD

BACKGROUND TO THE INVENTION

This invention relates to a mining method and apparatus, and in particular to a double slot selective mining system, In conventional gold mining methods, the gold-bearing reef is won from the working face of a stope which has a width great enough to permit personnel access to the working face. The blasting that is used to advance the working face is non-selective in the sense that the reef becomes mixed up with the barren rock. Consequently, a vast quantity of barren rock is recovered and subsequently processed along with the reef in order to recover the valuable mineral content. This leads to a waste of time, money and manpower.

A previously suggested method for selective mining has included the step of cutting a slot with a single wire saw above and below the reef between two pre-developed gulleys extending along either side of the reef. This method suffers the disadvantages of jamming of the wire saw, poor machine utilization and relatively low system efficiency.

The present invention seeks to address these problems.

SUMMARY OF THE INVENTION

A first aspect of the invention provides a double slot wire sawing machine comprising a mobile chassis and drive means on the chassis for simultaneously and independently driving two separate wire saws. The preferred machine has a pair of sheaves which are mounted on the chassis and about which the separate wire saws are looped in use, and means for independently driving the sheaves. The machine may also include guide means, generally pulleys, which are associated with the sheaves and which are arranged to provide an appropriate angle of wrap of each wise saw on each sheave.

Preferably, the position of each sheave is adjustable on the chassis to permit the tensions in the wire saws to be equalised at least at the commencement of a wire sawing operation.

There may be independent hydraulic motors for driving the sheaves. In the preferred embodiment, there is a single prime mover and at least one hydraulic pump which is powered by the prime mover and which drives the hydraulic motors.

Conveniently, the chassis is fitted with rail wheels adapted to run on rails and wherein the machine includes chassis drive means for driving the machine along the rails. The machine may also include control means operable to control the driving power and torque of the sheaves, the rotary speed of the sheaves and the operation of the chassis drive means, as selected.

In some cases, the chassis drive means comprises a rack and pinion drive. In other cases, the chassis drive means comprises a chain and sprocket drive.

A second aspect of the invention provides a wire sawing apparatus comprising a double slot wire sawing machine according to any one of the preceding claims and a deflection pulley apparatus which includes a plurality of deflection pulleys, the deflection pulley apparatus being locatable in relation to the wire sawing machine in a manner for the pulleys to cause deflection of the wire saws into a desired cutting area. The deflection pulley apparatus can comprise a post which is mountable movably on rails on which the wire sawing machine is also movable, and clusters of pulleys mounted movably on the post. Alternatively, the deflection pulley apparatus can comprise a post, means for anchoring the post between the hanging wall and footwall in a mine working, and clusters of pulleys mounted movably on the post.

A third aspect of the invention provides an underground mining apparatus comprising:
  a pair of separate, endless wire saws,
  a mobile machine which includes means for simultaneously and independently driving the two wire saws, and
  means for guiding the wire saws to cut through rock in spaced apart planes located respectively above and below a section of the rock which it is desired to remove.

In this apparatus, the wire sawing machine preferably also includes control means for controlling the operation of the wire saw driving means so as to ensure that one of the wire saws is located substantially directly over the other wire saw during cutting. The preferred machine is as summarised above.

A fourth aspect of the invention provides a method of underground mining which comprises:
  independently and simultaneously driving first and second, separate wire saws against a body of rock thereby to cut through the body of rock at positions respectively above and below a section of the body of rock which is to be removed, and
  controlling the driving of the wire saws as appropriate to ensure that an operatively upper one of the wire saws is substantially directly above the other wire saw.

The wire saws are preferably driven by a single machine which is caused to traverse along a fixed path during cutting. The preferred method also includes the steps of equalising the tension in the two wire saws at the commencement of a cutting operation and thereafter, during cutting and as appropriate, varying the speed of the wire saws to ensure the operatively upper wire saw is substantially directly above the other wire saw.

BRIEF DESCRIPTION OF THE DRAWINGS

The invention will now be described in more detail, by way of example only, with reference to the accompanying drawings in which.

DESCRIPTION OF EMBODIMENTS

Figure 1:
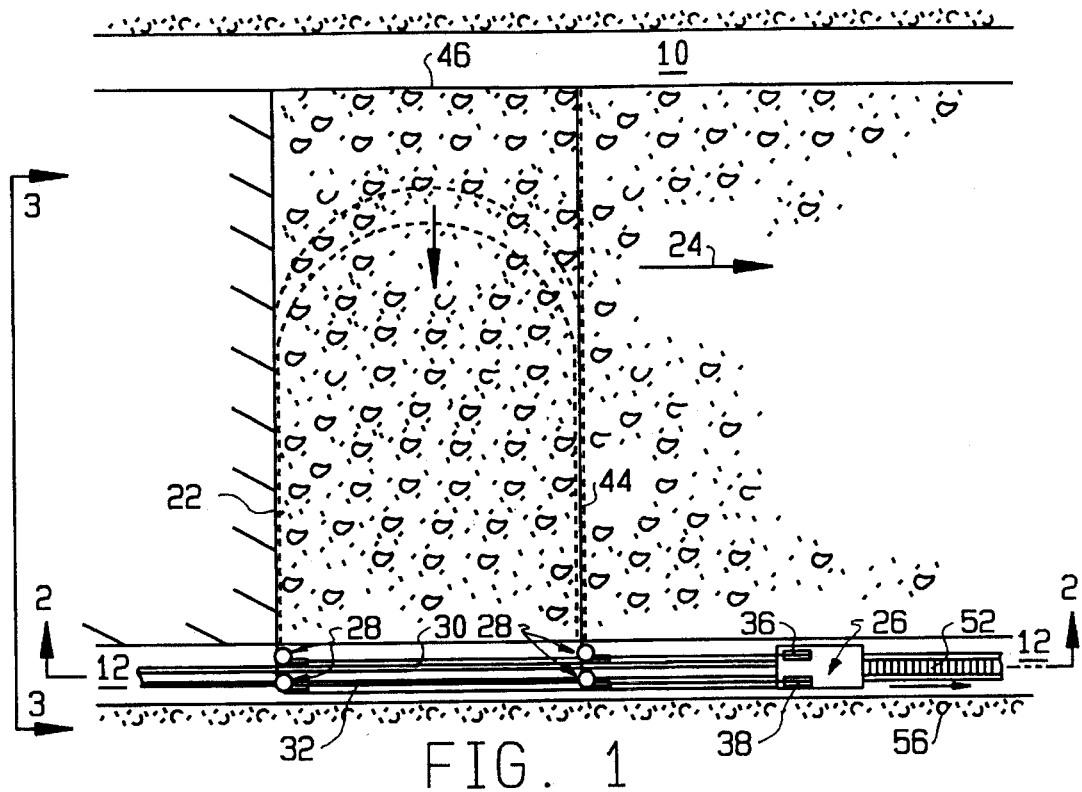
FIG. 1 shows a diagrammatic plan view illustrating a method of selective mining contemplated by the invention.

In FIG. 1, the numerals 10 and 12 refer to gulleys which are formed in the rock mass in an underground gold mine.

Figure 3:
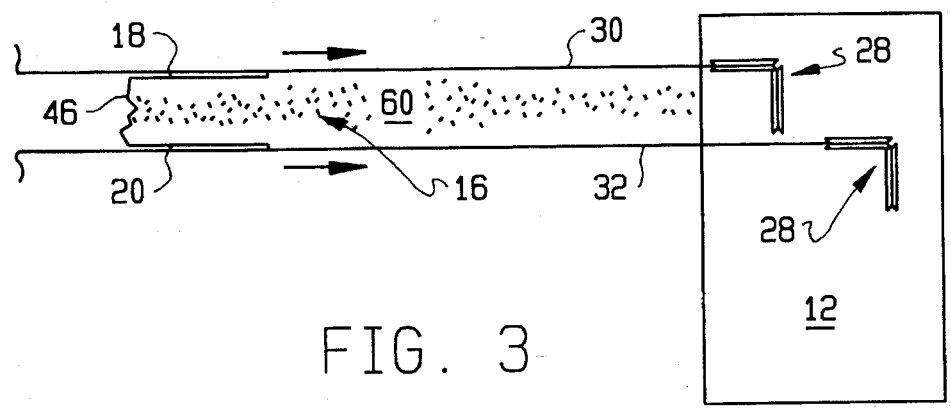
FIG. 3 shows another vertical cross-section at an underground location in a gold mine, looking in the direction of arrows 3—3 in FIG. 1.

Each gulley has dimensions sufficient to permit personnel access. The gulleys may for instance, have a width of 1,2 m or more. The gulleys are spaced apart by about 15 to 20 meters or possibly more. The gold-bearing reef is indicated with the numeral 16 (FIG. 3) and the numerals 18 and 20 indicate upper and lower cuts made simultaneously just above and just below the reef 16 respectively. The cuts 18 and 20 extend from one gulley to the other and will, in a typical case, be spaced apart by a vertical distance of about 300 mm or even less.

Figure 2:
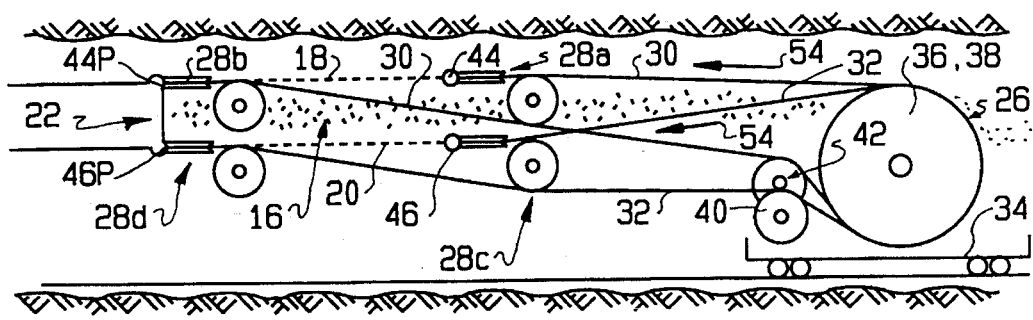
FIG. 2 shows a vertical cross-section taken at the line 2—2 in FIG. 1.

In FIGS. 1 and 2, the numeral 22 denotes the mining face i.e. the current position of the reef. It will be noted in FIG. 1 that the gulleys 10 and 12 extend, in the mining direction 24, for quite some distance into the rock mass beyond the face 22. The gulleys may be pre-developed to facilitate the reef recovery methods described below. Alternatively, the gulleys may be developed concurrently with the recovery of the reef.

Also shown in these Figures is wire saw driving apparatus according to the invention comprising a wire saw driving machine, shown schematically in FIGS. 1 and 2 by the numeral 26, and deflector pulley means 28, labelled 28a to 28d in FIG. 2, for deflecting the endless diamond impregnated wire saws 30 and 32 driven by the machine 26 into the desired cutting area.

The wire saw driving machine comprises a chassis, shown schematically at 34 in FIG. 2, and drive means in the form of a double sheave drive 36 and 38 for independently driving the two wire saws 30 and 32.

Each sheave drive 36 and 38 has associated guide means 40 and 42 in the form of guide pulleys for providing a sufficient angle of wrap of wire saw on each sheave. In this embodiment, the guide pulleys are provided with dampers to dampen vibrations and whip in the associated wire saw during a cutting operation. The positions of the sheave drives 40 and 42 on the machine chassis 34 are independently adjustable. This enables them to take up or create slack, and thereby equalise the tension in the associated wires saws at start-up, as subsequently described in more detail.

Referring again to FIGS. 1 to 3, a hole 44 is drilled from one gulley to the next at a level just above the upper surface of the reef 16, i.e. at the level of the cut 18. At the same time, another hole 46 is drilled from one gulley to the next at a level just below the lower surface of the reef 16, i.e. at the level of the cut 20.

The endless diamond wire saw 30 is threaded through the hole 44, is looped about the exposed surface in the gulley 10, and is passed across the face 22 back to the gulley 12 where it is looped about the drive sheave 38. As it enters the hole 44, the wire saw 30 passes about one of the deflector pulley means 28a and as it returns to the end of the face 22 in the gulley 12, it passes about a further deflector pulley means 28b. It will be seen that the wire saw 30 forms an endless loop about the various surfaces and pulleys.

At the same time, the other wire saw 32 is looped m the same manner as the wire saw 30. The cuts 18 and 20 are consequently formed simultaneously after initial drilling of the relevant inter-gulley holes. The separate wire saws, each with its own drive, can be used to form the cuts 18 and 20 at the same time, as described below.

The predrilled holes from the immediately preceding cutting operation are referenced 44P and 46P.

It should be noted that the holes 44 and 46 which extend from one gulley to the other to take the wire saws could be replaced by a single, small gallery driven between the respective gulleys. The gallery could for instance, have a rectangular cross-section with dimensions of, say, 700 mm by 700 mm. In this case, both wire saws would pass through the same gallery.

The drive sheaves 36 and 38 on the wire saw driving machine 26 are independently driven in rotation by a common prime mover in the form of an electric motor 50 mounted on the chassis 34 of the machine 26.

The wire saw driving machine is also capable of driving itself along a track 52 located in the gulley 12.

In use, with the drive sheaves operative, the wire saws 30 and 32 move continuously in the direction indicated by the arrows 54 in FIG. 2. At the same time, the driving machine 26 moves slowly along the track 52 in the direction of the arrow 56. This causes both of the wire saws to cut into the rock, the broken lines in FIG. 1 illustrating successive positions of the wire saws as cutting proceeds. The progress of the cuts can be seen clearly in FIG. 3. Eventually, the wire saws cut right through the rock mass between the galleys and the cuts 18 and 20 are formed.

The cutting operation proceeds in increments of, say, 1 meter after which the slotted beam of rock is immediately removed using any appropriate method. It is anticipated that the rock mass 60 formed between the cuts 18 and 20 will break off under its own weight, as the cuts proceed, if favourable fracture patterns are present.

If the rock mass does not break off under its own weight, wedges can be driven into the cuts 18 and 20 to break off the mass mechanically. Alternatively, ribbon-type elongate explosive charges, typically in the form of detonation cord, are inserted into the cuts and detonated to initiate the desired breakage. After each cycle of rock removal the cutting operation can resume for the next cycle.

Figure 4:
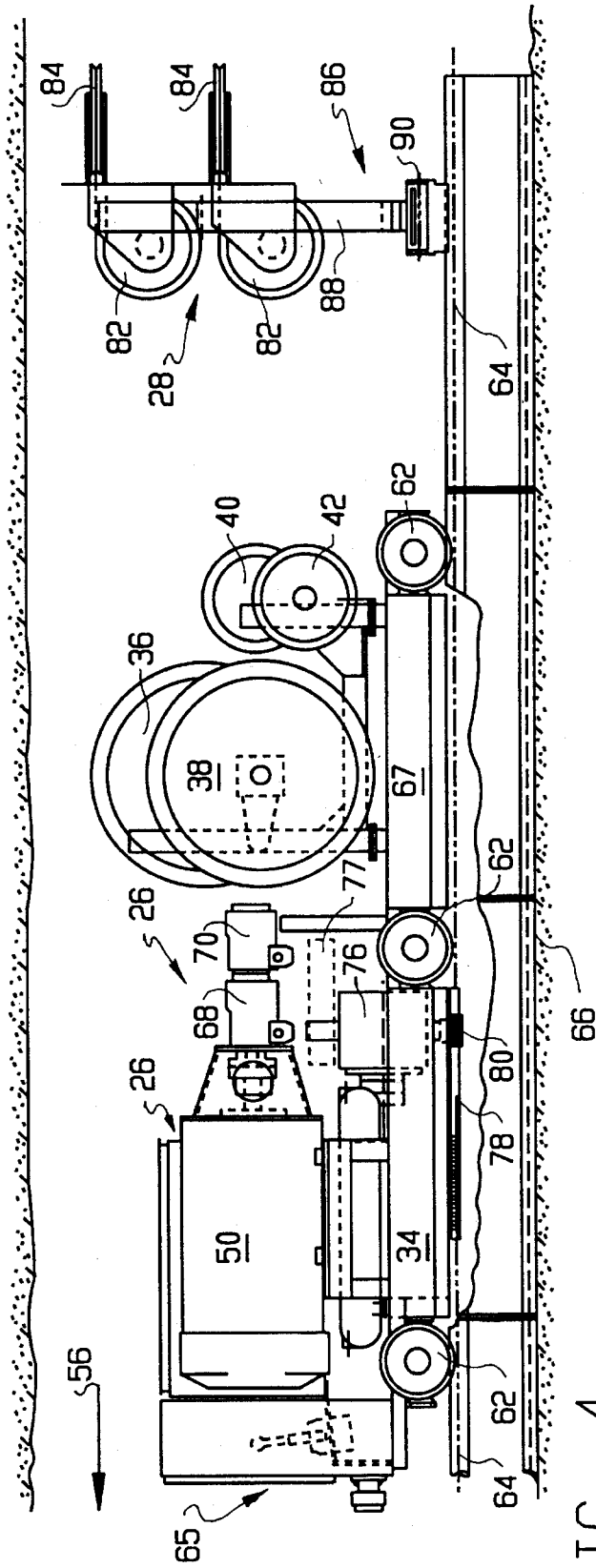
FIG. 4 shows a side view of wire saw driving apparatus according to the invention.
Figure 5:
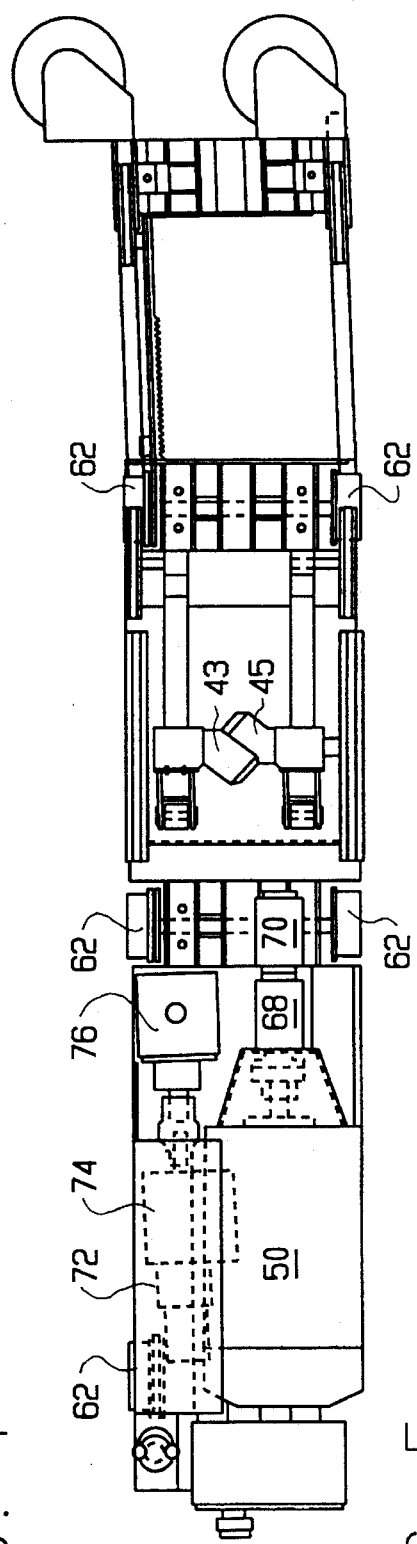
FIG. 5 shows a plan view of the apparatus shown in FIG. 4.

Reference is now made to FIGS. 4 and 5 which show respective side and plan views of wire saw driving apparatus according to the invention.

The apparatus seen in FIGS. 4 and 5 comprises a wire saw driving machine 26 and deflector pulley means 28 for deflecting the wire saws 30 and 32 driven by the machine 26 into a desired cutting area.

The machine 26 has a chassis 34 which is movably supported on rails 64 by wheels 62. The rails extend along the footwall 66 of the gulley. The portion of the machine illustrated to the left of the central small wheel 62 is a power pack carriage 65 while the portion of the machine to the right of the middle small wheel 62 is the drive sheave carriage 67.

The power pack carriage 65 carries the electric motor 50 which drives tandem/hydraulic pumps 68 and 70. Drive from another electric motor 72 passes through a reduction gear reduction apparatus 74 to a right angle drive unit 76 via a clutch. The unit 76 drives a pinion 80 meshing with a rack 78 extending longitudinally along a rail 64, as illustrated. Rotation of the pinion 80 relative to the rack traverses the machine 26 along the rails in the direction of arrow 56. A spring-applied, hydraulically released brake 77 is provided to brake the machine in the event of hydraulic failure.

The drive sheave carriage 67 supports the two drive sheaves 36 and 38. In front of the sheaves 36, 38 are guide means in the form of the guide pulleys 40 and 42. The drive sheaves 36 and 38 are independently driven by separately controlled hydraulic motors 43 and 45 supplied with hydraulic fluid by the hydraulic pumps 68, 70. The guide pulleys 40 and 42 ensure a sufficient wrap angle of wire saw on each sheave so that sufficient torque can be transmitted to the wire saw.

Figure 8:
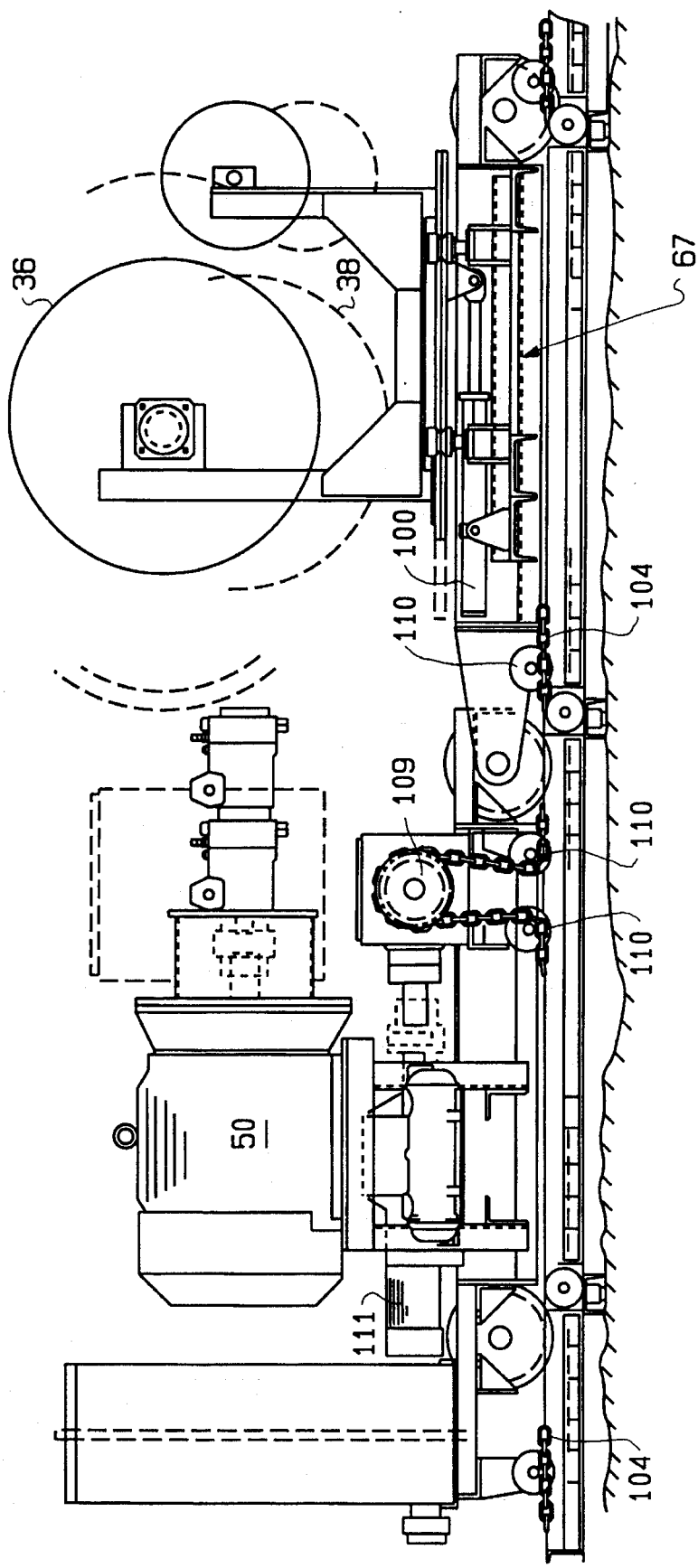
FIG. 8 shows a view corresponding to that of FIG. 4 but of a modified embodiment.
Figure 9:
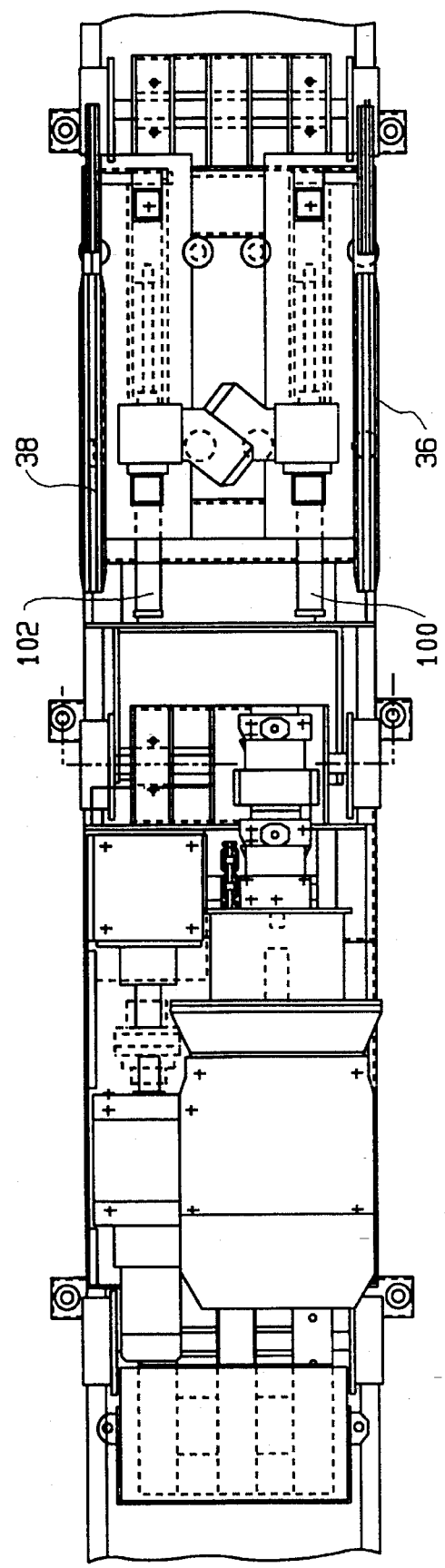
FIG. 9 shows a plan view of the machine seen in FIG. 8.

Reference is now made to FIGS. 8 and 9 which show views of a modified machine. Components in these Figures corresponding to components seen in FIGS. 4 and 5 are marked with the same reference numerals.

In the embodiment of FIGS. 8 and 9 the drive sheaves 36 and 38 can be adjusted back and forth on rollers, means of hydraulic cylinders 100 and 102, as indicated by the broken partial sheave outlines in FIG. 8. Each of these cylinders acts between a bracket on the chassis 34 and a bracket on the underside of the carriage 67. The cylinders 100 and 102 are independently operable to move their associated drive sheave back and forth.

In practice, it is important that the upper wire saw be maintained at a position substantially directly above the lower wire saw. It has been found that if one wire saw is allowed to proceed at a faster cutting rate than the other, i.e. to run away from the other wire saw, one or other of the wire saws will jam in the slot which it is cutting. On the other hand, wire saws located one over the other perform a stress relieving function as cutting proceeds, and the chances of wire jamming are reduced. With a view to promoting the desirable situation of one wire saw directly above the other, the cylinders 100 and 102 are extended or retracted as necessary at start-up to take up or cream slack as appropriate to ensure substantially equal tension in the wire saws.

During the actual cutting process, the cylinders 100 and 102 will generally not be operated. If one wire saw begins to run away from the other, i.e. to cut faster through the rock than the other, then the rotary speed of the sheave serving the flower cutting wire saw is increased. This increases the linear speed and cutting rate of the relevant wire saw and enables that saw to catch up to the faster cutting wire saw, thereby restoring the desirable situation that the wire saws are located one over the other.

One technique for freeing a jammed wire saw is to use the appropriate cylinder 100 or 102, associated with the jammed wire saw, to cause the unjammed wire saw to cut slightly ahead of the jammed wire saw. In some instances, this may serve a stress relieving function which will release the jammed wire saw. However, it will generally be undesirable, as explained above, to allow one wire saw to get too far ahead of the other, since this will lead to likelihood of further jamming and difficulties in restoring the desired situation of one wire saw directly over the other.

In FIGS. 8 and 9 the machine is driven along the rail by a chain and sprocket drive as opposed to a rack and pinion drive as in FIGS. 4 and 5. As shown in FIG. 8, there is a chain 104 which passes over idler sprockets 110 and a drive sprocket 109 driven by a motor 111. At its extreme end, the chain is attached to a fixed structure in the mine working, and the driven sprocket is operated to drive the entire machine in the appropriate direction forwardly by winding the chain in or out.

The machines 26 described above include control apparatus comprising a programmable logic controller (PLC) which enables the machine's operating parameters and safety trip limits can be preset by an operator of the machine. Also, under the control of the PLC (not shown), the wire saws can be driven during a cutting operation at predetermined machine power, predetermined traverse rate and predetermined tension, as required by the operating circumstances.

In the constant power mode, the machine 26 travels on the rails 64 in such a manner as to maintain a constant torque on the wire saw for a given wire speed. In the constant traverse tensioning mode, the machine operates at a constant traverse speed selected by the operator on the PLC and is not affected by fluctuating tension reactive forces. As explained previously, the sheave positions will be adjusted at start up to take up or create slack, as appropriate, to ensure substantially equal tension in the two wire saws. Thereafter, during cutting, wire saw speed can be varied as required to maintain one wire saw directly above the other. The PLC may be programmed to make automatic adjustments to the rotary speed of a relevant sheave to ensure that this desirable situation is maintained.

The positive rack and pinion or chain sprocket drive enables the machine to operate at an inclination to the horizontal in both directions. A conventional braking system as described above in relation to the friction brake 77 can prevent an uncontrolled runaway condition when the machine operates on an incline.

Generally speaking, an advantage of a chain drive as opposed to a rack and pinion drive is the fact that the chain drive can take account of variations in the footwall along the length of the gulley, whereas a rigid rack cannot.

Either embodiment of machine may have a substantially modular construction to facilitates underground transportation, installation and maintenance.

In FIGS. 4 and 5, the deflector pulley means 28 comprises a pair of pulleys 82 and 84 supported rotatably at right angles to each other so that the wire saw travelling over the pulleys is supported in two mutually transverse directions. The pair or cluster of pulleys 82 and 84 is pivotally mounted on a support shown generally at 86. The support 86 includes a post 88 which is mounted on a base frame 90 that can be moved along the rails 64 and which therefore permits the cluster of pulleys 82 and 84 to be moved along the rails 64. Thus the pulleys 82 and 84 can be positioned remote from the machine 26 in alignment with the drive sheaves 36 and 38.

The sheaves 36 and 38 rotate in planes which are parallel to the longitudinal axis of the driving machine 26. The pivotal freedom of the deflection pulley clusters allows them to accommodate the wire saws if changes in direction are required during a cutting operation.

Figure 6:
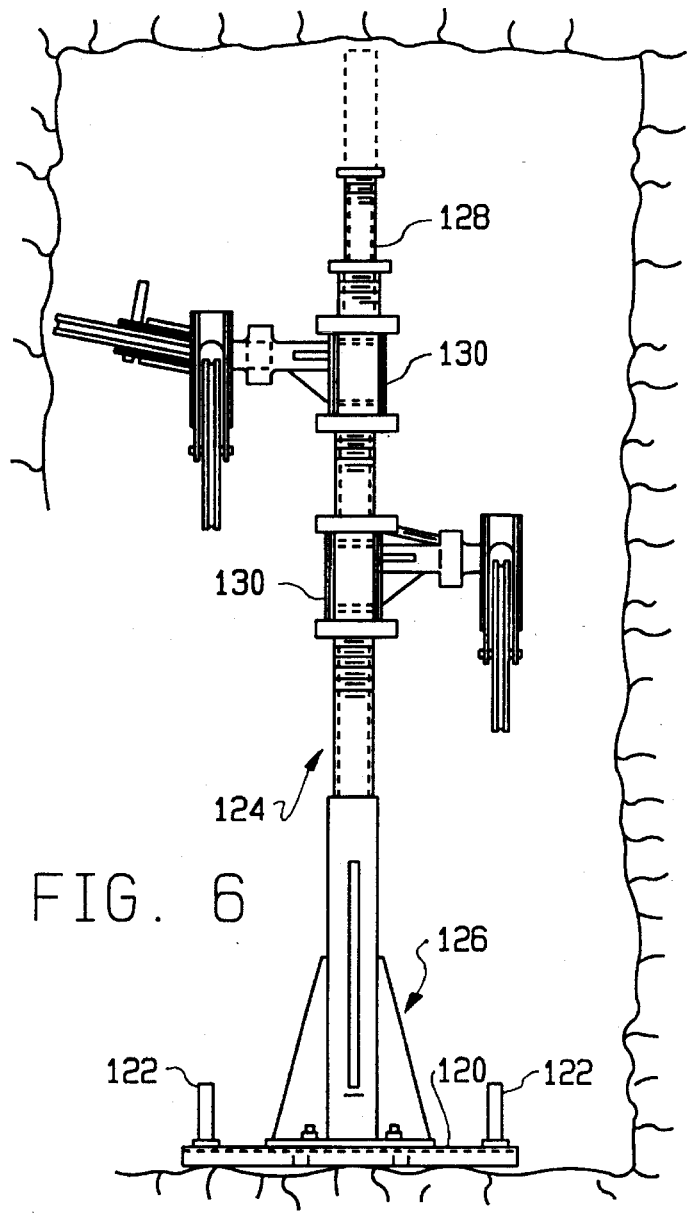
FIG. 6 shows a side view of a deflector pulley support stand.
Figure 7:
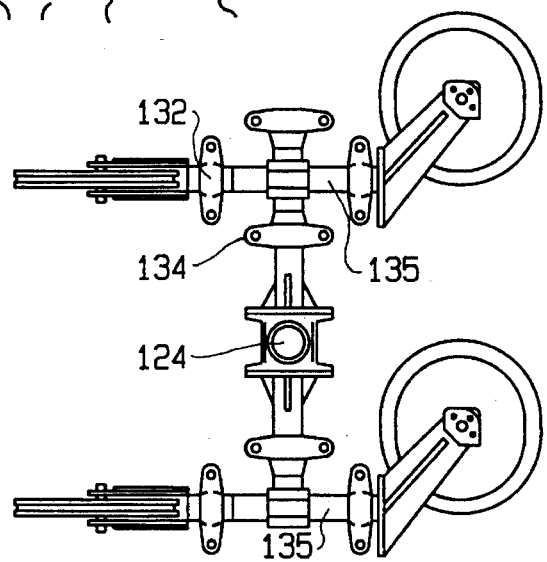
FIG. 7 shows a plan view of the support stand seen in FIG. 6.

FIGS. 6 and 7 illustrate an alternative, free standing pulley deflector means which can be used instead of that described above. In this case, there is a base plate 120 that is levelled in practice by means of jacking screws 122 and is bolted to the footwall in the gulley. An upstanding post 124 is connected to the base plate 120 by means of a bracket 126 which is adjustable to allow alignment of the post with the centre line of the machine. The post is secured relative to the hanging wall of the gulley by means of a threaded extension member 128 which can be screwed out of the post and into firm engagement with the hanging wall.

The various deflector pulleys carried by the post can then be aligned properly with the drive sheaves 36 and 38, and with the desired cutting plane, by appropriate adjustment of vertical slides 130, one for each pulley cluster, and by appropriate rotation of rotation brackets 132 and 134 which allow for rotation in two degrees of freedom. Tubes 135 are arranged to slide in respective brackets and thereby permit exact alignment of each wire saw with the hole which it enters.

In practice, the free-standing apparatus seen in FIGS. 6 and 7 can be located some distance away from the drive machine itself and is, as explained above, independently locked in position in the mine working. In each case, the pulley clusters are designed in such a way as to render the wire captive between them. This eliminates the possibility of the diamond wire saw coming off the pulleys which would seriously hamper the cutting operation. Of course, the deflection pulley apparatus of FIGS. 6 and 7 could also be modified so as to be movable along the rails 64 as in the case of the apparatus of FIGS. 4 and 5.

Mention was made above about the provision of dampers on the guide pulleys 40, 42 for the purposes of damping wire saw vibrations. In practice, appropriate dampers can be provided at any appropriate point on the wire saw drives. The dampers may, for instance, be provided in association with the deflector pulleys or their mountings.

The main advantage of the invention as described above is seen to reside in the fact that there are independently driven, separate wire saws which can be driven in such a manner that one wire saw is maintained substantially directly over the other. This in turn reduces the likelihood of wire saw jamming and the consequent down-time while unjamming procedures are implemented. It is believed that the invention as described above also has a number of other advantages including, inter alia, the following:

1. Mining of the reef is done concurrently with the sawing operation. Even if it is used, detonating cord produces a minimal amount of noxious gasses. Also, it is envisaged that it will be possible to provide a single machine 26 to cut on both sides of a gulley in which the machine operates. In this case, the holes 44, 46 (or gallery) will extend in opposite directions from the gulley in question After a full cut has been made on one side of the gulley, and rock removal procedures are implemented on that side, the machine 26 can be used to form a cut on the opposite side of the gulley. Thus the operation of the machine alternates from side to side.

With these features the mining process can be considered to be substantially continuous.

2. By cutting the required two slots in one operation, maximum use is made of the diamond wire machinery since one machine drives both wires.

3. As described above, if one wire saw jams, the remaining free wire can be caused to continue cutting by appropriate movement of the relevant sheave on the chassis. This may relieve the stresses pinching the jammed wire, hence assisting in its release and allowing the slotting operation to resume. Although only one wire is performing a cutting action at this stage, this technique is, of course, only permitted by the independent nature of the two wire saws.

Should the stress relieving technique just described not be successful, detonating cord can be inserted in the place of the unjammed wire, and detonated. This propagates a crack between the two slots, starting and ending at the tip of the slots respectively, thereby freeing the jammed wire and allowing the slotting operation to resume.

4. As the slotted rock is mined out before sawing resumes in the next cycle, slotting can be resumed using a wire saw of substantially any given diameter.

Previous wire sawing methods required the completion of a full slot, i.e. over the entire panel length and width, which required that a length of diamond wire having sufficient remaining life be used. This often resulted in a length of diamond wire having to be discarded before reaching the end of its life, as it is impossible to thread a newer wire in the slot made by an older wire, because the unworn diamond beads would have a larger size.

5. The continuous rock removal made possible using the described process allows for appropriate face supports to be installed earlier and nearer to the cut face compared to previous methods, hence limiting slot closure.

6. Flushing water can easily be introduced into the slot where it is required. This is achieved using a water lance inserted in the mined out area, just behind the face being cut. Previous wire sawing methods restricted the access of water to the drilled holes 44 used to thread the wire around the block of rock to be cut.

7. The use of independently driven wire saws enables the two wires to be driven at different speeds to give the same cutting rate with appropriately set wire tensions.

8. The hydraulic system used to drive the sheaves can operate under dose control in a dosed loop hydraulic circuit. It is believed that a system such as this will be less prone to breakdown than other possible independent drives, such as AC or DC electric motors. Added to this, the hydraulic drive system can be extremely compact.

9. The use of a PLC to implement automatic wire saw speed changes in response to one wire saw cutting faster than the other. This enables the desirable situation of one wire saw directly over the other to be maintained automatically.

We claim:

1. A double slot wire sawing machine comprising a mobile chassis, a pair of sheaves which are mounted on the chassis and about which two separate wire saws are looped in use, and means for driving the sheaves so as to drive the two separate wire saws simultaneously and independently, the position of each sheave being adjustable on the chassis to permit the tensions in the wire saws to be equalised at least at the commencement of a wire sawing operation.

2. A double slot wire sawing machine according to claim 1 and comprising guide means which are associated with the sheaves and which are arranged to provide an appropriate angle of wrap of each wire saw on each sheave.

3. A double slot wire sawing machine according to claim 2 wherein the guide means comprise pulleys.

4. A double slot wire sawing machine according to claim 1 comprising independent hydraulic motors for driving the sheaves.

5. A double slot wire sawing machine according to claim 4 comprising a single prime mover and at least one hydraulic pump which is powered by the prime mover and which drives the hydraulic motors.

6. A double slot wire sawing machine according to claim 1 wherein the chassis is fitted with rail wheels adapted to run on rails and wherein the machine includes chassis drive means for driving the machine along the rails.

7. A double slot wire sawing machine according to claim 6 comprising control means operable to control the driving power and torque of the sheaves, the rotary speed of the sheaves and the operation of the chassis drive means, as selected.

8. A double slot wire sawing machine according to claim 7 wherein the chassis drive means comprises a rack and pinion drive.

9. A double slot wire sawing machine according to claim 7 wherein the chassis drive means comprises a chain and sprocket drive.

10. A wire sawing apparatus comprising a double slot wire sawing machine which includes a mobile chassis and drive means on the chassis for simultaneously and independently driving two separate wire saws, and a deflection pulley apparatus which comprises a post mountable movably on rails on which the wire sawing machine is also movable, and clusters of pulleys mounted movably on the post, the post being locatable in relation to the wire sawing machine in a manner for the pulleys to cause deflection of the wire saws into a desired cutting area.

11. A wire sawing apparatus comprising a double slot wire sawing machine which includes a mobile chassis and drive means on the chassis for simultaneously and independently driving two separate wire saws, and a deflection pulley apparatus which includes a post, means for anchoring the post between the hanging wall and footwall in a mine working, and clusters of pulleys mounted movably on the post, the post being locatable in relation to the wire sawing machine in a manner for the pulleys to cause deflection Of the wire saws into a desired cutting area.

12. An underground mining apparatus comprising:

a pair of separate, endless wire saws, a mobile machine which includes means for simultaneously and independently driving the two wire saws, means for guiding the wire saws to cut through rock in spaced apart planes located respectively above and below a section of the rock which it is desire to remove, said means for guiding the wire saws comprising a deflection pulley apparatus which includes a plurality of deflection pulleys, the deflection pulley apparatus being locatable in relation to the wire sawing machine in a manner for the pulleys to cause deflection of the wire saws into a desired cutting area, and said deflection pulley apparatus comprising a post which is mountable movably on rails on which the wire sawing machine is also movable, and clusters of pulleys mounted movably on the post.

13. An underground mining apparatus comprising:

a pair of separate, endless wire saws, a mobile machine which includes means for simultaneously and independently driving the two wire saws, means for guiding the wire saws to cut through rock in spaced apart planes located respectively above and below a section of the rock which it is desire to remove, said means for guiding the wire saws comprising a deflection pulley apparatus which includes a plurality of deflection pulleys, the deflection pulley apparatus being locatable in relation to the wire sawing machine in a manner for the pulleys to cause deflection of the wire saws into a desired cutting area, and said deflection pulley apparatus comprising a post, means for anchoring the post between the hanging wall and footwall in a mine working, and clusters of pulleys mounted movably on the post.

14. A method of underground mining which comprises:

during a cutting operation, independently and simultaneously driving upper and lower, separate wire saws against a body of rock thereby to cut through the body of rock at positions respectively above and below a section of the body of rock which is to be removed, at the commencement of the cutting operation, equalising the tension in the two wire saws and thereafter, during the cutting operation and as appropriate, varying the speed of the wire saws to ensure that the upper wire saw is substantially directly above the lower wire saw.

* * * * *